United States Patent Office 3,637,735
Patented Jan. 25, 1972

3,637,735
SILYLMETHYL THIOPSEUDOUREA SALTS
Sandor Barcza, West Orange, N.J., assignor to Sandoz-Wander, Inc., Hanover, N.J.
No Drawing. Filed Feb. 24, 1970, Ser. No. 13,819
Int. Cl. C07d 49/39; C07f 7/10
U.S. Cl. 260—309.6        3 Claims

ABSTRACT OF THE DISCLOSURE

The compounds are tri-substituted silylmethyl thiopseudourea salts, e.g., 1,3-dimethyl-2-trimethylsilylmethylthiopseudourea hydrochloride, and are useful as anti-inflammatory agents and analgesics. Said compounds are obtainable by reacting a suitable trisubstituted halomethylsilane with a thiourea.

---

This invention relates to silicon-containing compounds, and more particularly to tri-substituted silylmethylpseudourea salts, and to the preparation thereof, as well as to pharmaceutical compositions containing said compounds and to the use of such compositions.

The active agents with which this invention is concerned may be represented by the following formula (Compound I):

I

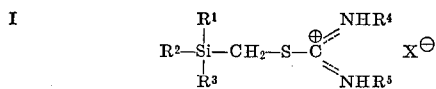

wherein $R^1$ is lower alkyl, or mono-(lower) alkoxy-phenyl, or phenyl having two adjacent substituents, the substituents being lower alkoxy groups, or a dioxymethylene group at the 3- and 4-positions;

Each of $R^2$ and $R^3$ is, independently, lower alkyl;

$R^4$ and $R^5$ are the same and are each either a hydrogen atom or lower alkyl; or $R^4$ and $R^5$ form through a short linear alkylene chain, e.g., having from 2 to 4 carbon atoms, such as ethylene, trimethylene, or tetramethylene, together with the carbon atom bound to the two nitrogen atoms, a heterocyclic ring containing 3 to 5 carbon atoms and two nitrogen atoms; and X is a non-toxic pharmaceutically acceptable inorganic or organic anion, but preferably is an inorganic anion, such as the residue of a mineral acid, e.g. a halide having an atomic weight of from 35 to 127, i.e., chloride, bromide or iodide, or nitrate, sulfate or phosphate. Suitable organic anions include the residue of alkanoic acids, e.g. acetate.

With respect to the terms used in the above definitions "lower alkyl" and the lower alkyl portion of a lower alkoxy group include those groups having from 1 to 4 carbon atoms, i.e. methyl, ethyl, propyl and butyl and their isomeric forms, preferably those forms not having branching on the alpha-carbon atom.

It is preferred that $R^1$, $R^2$ and $R^3$ are the same, and it is also preferred that they be methyl. It is also preferred that $R^4$ and $R^5$ be the same.

Certain of Compounds I are known, e.g., 2-trimethylsilylmethylthiopseudourea hydrochloride (described in U.S. Pat. 2,719,165) and the present invention only contemplates novel pharmaceutical compositions containing such compounds and the use thereof. The remaining compounds may be prepared in a manner analogous to that employed to obtain the known compounds.

Compounds $I_Z$ are analogous to Compounds I, except that X is replaced by Z; are obtainable by isothiouronium halide formation, i.e. by reacting a trisubstituted silylmethyl halide compound of the formula (Compound II):

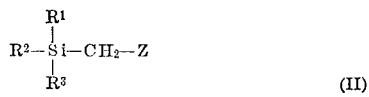

wherein $R^1$, $R^2$ and $R^3$ are as defined above; and Z is a halogen atom, e.g. fluoro, chloro, bromo or iodo; with a thiourea of the formula ( a Compound III):

wherein $R^4$ and $R^5$ are as defined above, in a solvent, e.g. an ether such as dioxane or dimethoxyethane, or a lower alkanol such as methanol or ethanol or dimethyl formamide or dimethylacetamide, at moderate temperatures, e.g. from about 20° to 180° C., preferably at the reflux temperature of the solvent.

Preferably the reaction is carried out in the presence of a catalytic amount of an alkali metal halide, e.g. sodium iodide. A preferred halide as Z is iodo.

The starting materials, i.e. Compounds II and III are known and may be prepared as described in the literature, or where not known may be prepared in a manner analogous to that reported in the literature for preparing the known compounds.

It will be noted that Compounds $I_Z$ overlap the scope of Compounds I. Where any Compound I is desired wherein X is other than Z, it may be obtained by carrying out a salt exchange reaction on a suitable Compound $I_Z$ in a conventional manner to replace the Z anion with another anion suitable as X, the Z and X anions being as defined above. For example, salt exchange may be achieved by using a well known ion-exchange technique, e.g. passing a solution of a Compound $I_Z$ over an ion exchange resin which will contribute the desired X anion, or by adding an X-anion bearing salt to a solution of a Compound $I_Z$; the solvent and reaction conditions being selected so that the resulting Compound I is found in a different phase than the resulting Z-anion bearing salt, e.g. either of the resulting reaction products may form a precipitate which can easily be removed, leaving the other reaction product in solution.

The Compounds I of this invention are useful as pharmaceutical agents as they possess both anti-inflammatory and analgesic activity. The above-mentioned anti-inflammatory activity of these compounds is indicated by their activity in rats using the acute carrageenan-induced edema procedure substantially as described by Winter (Proc. Soc. Exp. Biol., 111, 544, 1962). The above-mentioned analgesic activity is indicated by the well known Randall-Selitto Method; the compound to be tested is administered orally: L. O. Randall and J. J. Selitto (Arch. Int. Pharmacodyn. 111: 409, 1957) as modified by C. A. Winter and L. Flataker (J.P.E.T. 148: 373, 1965).

For such uses the compounds may be administered orally or parenterally as such or admixed with conventional pharmaceutical carriers. They may be administered orally in such forms as tablets, dispersible powders, granules, capsules, syrups and elixirs, and parenterally as solutions, suspensions, dipersions, emulsions, and the like; e.g. a sterile injectable aqueous suspension. The compositions for oral use may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g., inert diluents, such as calcium carbonate, sodium carbonate, lactose and talc, granulating and disintegrating agents, e.g. starch and alginic acid, binding agents, e.g. starch, gelatin and acacia, and lubricating agents, e.g. magnesium stearate, stearic acid and talc. The tablets may be uncoated or coated by known techniques to delay disintegration and absorption in the gastro-intestinal tract and thereby provide a sustained action over a longer period. Similarly, suspensions, syrups and elixirs may contain the active ingredient in admixture with any of the conventional excipients utilized for the preparation of such compositions, e.g. suspending agents (methylcellulose, tragacanth and sodium alginate), wetting agents (lecithin, polyoxyethylene stearate and polyoxyethylene sorbitan mono-oleate) and preservatives (ethyl-p-hydroxybenzoate). Capsules may contain the active ingredient alone or admixed with an inert solid diluent, e.g. calcium carbonate, calcium phosphate and kaolin. The injectable compositions are formulated as known in the art and may contain appropriate dispersing or wetting agents and suspending agents identical or similar to those mentioned above. These pharmaceutical preparations may contain about 10–90% of the active ingredient in combination with the carrier or adjuvant.

The dosage of active ingredient employed for the alleviation of either pain or inflammation may vary depending on the particular compound employed and the severity of the condition being treated. However, in general, satisfactory results are obtained when the Compounds (I) are administered at a daily dosage orally of from about 2 mg. to about 200 mg. per kg. of animal body weight, preferably given in divided doses two to four times a day, or in sustained release form. For most large mammals, the total daily oral dosage is from about 50 mg. to about 1000 mg., preferably from about 50 milligrams to about 250 milligrams. Dosage forms suitable for internal use comprise from about 12.5 mg. to about 500 mg. of the active compound, preferably from about 12.5 mg. of about 50 mg.

The preferred pharmaceutical compositions from the standpoint of preparation and ease of administration are solid compositions, particularly hard-filled capsules and tablets.

The following examples are presented as illustrative of this invention. All temperatures are centigrade and room temperature is 20° to 30° C., unless indicated otherwise.

EXAMPLE 1

2-(3-methoxyphenyldimethylsilylmethylthio)-
Pseudourea Hydrochloride

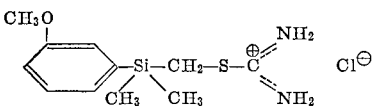

Step A.—3 methoxyphenyl-dimethylsilyl-methylchloride

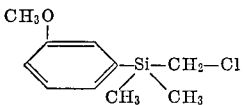

Under nitrogen, 1.32 g. of magnesium turnings, 50 ml. of absolute ether and one drop of methyl iodide is brought to reflux, then 9.35 g. of m-bromoanisole is added dropwise at reflux. When the magnesium has disappeared, the mixture is cooled and added dropwise at —40° to 7.15 g. of chloromethyl-dimethyl-chlorosilane. The mixture is then warmed to room temperature and then refluxed for 18 hours. After concentration to remove solvent, the residue is taken up in benzene and washed three times with water, dried with sodium sulfate, concentrated and distilled, to obtain 3 - methoxyphenyl - dimethylsilyl-methylchloride; B.P. 87–90°/0.1 mm. Hg. This compound is used in Step B, below.

Step B.—2-(3-methoxyphenyldimethylsilylmethylthio)-
pseudourea hydrochloride

In 15 ml. of 95% ethanol 2.937 g. (13.6 mmoles) of the 3-methoxyphenyl-dimethylsilyl-methylchloride, 1.079 g. (13.6 mmoles) of thiourea and 0.1021 g. (0.685 mmole) of sodium iodide is refluxed for 2 days and the solution is then concentrated in vacuo. The crude product, i.e., 2 - (3-methoxyphenyldimethylsilylmethylthio)-pseudourea hydrochloride, slowly solidifies and is then recrystallized from acetone, M.P. (135)—142–145°.

EXAMPLE 2

2-Trimethylsilylmethylthio-2-imidazoline Hydrochloride

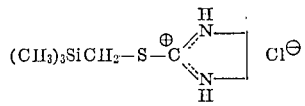

10.2 g. ethylene-thiourea, 14.7 g. of trimethyl chloromethylsilane and 0.75 g. of sodium iodide in 50 ml. of spectrographic grade methanol are refluxed for one day and then concentrated to obtain the crude 2-trimethyl-silylmethylthio-2-imidazoline hydrochloride. Crystallized with acetone: M.P. 137–139°; recrystallization from ethyl acetate: M.P. (139)—141°.

EXAMPLE 3

1,3-Dimethyl-2-trimethylsilylmethylthiopseudourea
Hydrochloride

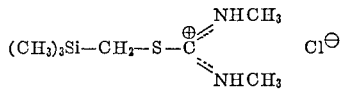

A mixture of 14.7 g. of trimethyl-chloromethylsilane, 10.4 g. of N,N'-dimethylthiourea, 0.75 g. of sodium iodide and 50 ml. of spectrographic grade methanol is refluxed for four days. The solution is then concentrated in vacuo and the residue is crystallized from pentane (50 ml.) to obtain 1,3-dimethyl-2-trimethylsilylmethylthio-pseudourea hydrochloride. The first crop is recrystallized from ethyl acetate to obtain the title product, M.P. 132–136°.

EXAMPLE 4

2-Trimethylsilylmethylthiopseudourea Hydrochloride

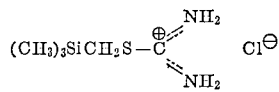

The title compound is prepared by refluxing a methanolic solution of equimolar amounts of thiourea and trimethyl-chloromethyl-silane with a catalytic amount of sodium iodide as described in Example 2. This compound is known.

EXAMPLE 5

Tablets

Tablets suitable for oral administration which contain the following ingredients may be prepared by conventional tabletting techniques. Such tablets are useful in treating inflammation or pain at a dose of one tablet 2 to 4 times a day.

| Ingredient: | Weight (mg.) |
| --- | --- |
| 2 - trimethylsilylmethylthiopseudourea hydrochloride | 25 |
| Tragacanth | 10 |
| Lactose | 422.5 |
| Corn starch | 25 |
| Talcum | 15 |
| Magnesium stearate | 2.5 |

EXAMPLE 6

Dry Filled Capsules

Capsules suitable for oral administration which contain the following ingredients are prepared in a conventional manner. Such capsules are useful in treating inflammation or pain at a dose of one capsule 2 to 4 times a day.

| Ingredient: | Weight (mg.) |
|---|---|
| 2 - trimethylsilylmethylthiopseudourea hydrochloride | 50 |
| Inert solid diluent (starch, lactose, kaolin) | 300 |

EXAMPLE 7

2-Trimethylsilylmethylthiopseudourea Acetate 1.9957 g. (about 10 mmoles) of 2-trimethylsilylmethylthiopseudourea hydrochloride is added to 0.8249 g. (about 10 mmoles) of sodium acetate in 20 ml. of ethanol (95%) and the mixture is stirred at room temperature for 4 hours. A precipitate appears (sodium chloride) and is filtered and washed with ethanol. The combined filtrate and wash are concentrated under vacuum to obtain the title compound as residue, M.P. 140–145° (dec.).

What is claimed is:

1. A compound of the formula:

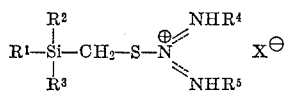

wherein $R^1$ is lower alkyl, or mono-alkoxy substituted phenyl, or phenyl having two adjacent substituents, the substituents being lower alkoxy groups, or a dioxymethylene group at the 3- and 4-positions;

each of $R^2$ and $R^3$ is, independently, lower alkyl;

$R^4$ and $R^5$ are the same and $R^4$ is lower alkyl; or $R^4$ and $R^5$ may be joined to form a short alkylene chain; and X is a non-toxic pharmaceutically acceptable inorganic or organic anion.

2. The compound of claim 1 which is 2-trimethylsilylmethylthio-2-imidazoline hydrochloride.

3. The compound of claim 1 which is 1,3-dimethyl-2-trimethylsilylmethylthiopseudourea hydrochloride.

References Cited

UNITED STATES PATENTS 2,719,165  9/1955  Cooper _____ 260—448.2 N

TOBIAS E. LEVOW, Primary Examiner

P. F. SHAVER, Assistant Examiner

U.S. Cl. X.R.

260—448.2 N, 448.2 B; 424—184

UNITED STATES PATENT OFFICE
CERTIFICATE OF CORRECTION

Patent No. 3,637,735        Dated January 25, 1972

Inventor(s) Sandor Barcza

It is certified that error appears in the above-identified patent and that said Letters Patent are hereby corrected as shown below:

Column 5 line 19    the formula    "$R^1-Si-CH_2-S-N$"
claim 1
                    should read   -- $R^1-Si-CH_2-S-C$ --.

Signed and sealed this 29th day of May 1973.

(SEAL)
Attest:

EDWARD M. FLETCHER, JR.           ROBERT GOTTSCHALK
Attesting Officer                  Commissioner of Patents